US007761557B2

(12) United States Patent
Fellenstein et al.

(10) Patent No.: US 7,761,557 B2
(45) Date of Patent: *Jul. 20, 2010

(54) FACILITATING OVERALL GRID ENVIRONMENT MANAGEMENT BY MONITORING AND DISTRIBUTING GRID ACTIVITY

(75) Inventors: Craig William Fellenstein, Brookfield, CT (US); Rick Allen Hamilton, II, Charlottesville, VA (US); Joshy Joseph, Poughkeepsie, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1354 days.

This patent is subject to a terminal disclaimer.

(21) Appl. No.: 11/031,490

(22) Filed: Jan. 6, 2005

(65) Prior Publication Data

US 2006/0150158 A1    Jul. 6, 2006

(51) Int. Cl.
*G06F 15/173* (2006.01)
(52) U.S. Cl. ...................... 709/224; 709/220
(58) Field of Classification Search ............ 709/205, 709/218, 224, 220, 249
See application file for complete search history.

(56) References Cited

U.S. PATENT DOCUMENTS

| 4,591,980 A | 5/1986 | Huberman et al. ............ 712/16 |
| 5,220,674 A | 6/1993 | Morgan et al. |
| 5,325,525 A | 6/1994 | Shan et al. ................. 718/104 |
| 5,630,156 A | 5/1997 | Privat et al. ................. 712/14 |
| 5,640,569 A | 6/1997 | Miller et al. |
| 5,729,472 A | 3/1998 | Seiffert et al. |

(Continued)

FOREIGN PATENT DOCUMENTS

EP          0790559 A      8/1997

(Continued)

OTHER PUBLICATIONS

GridFlow: workflow management for grid computing Junwei Cao Jarvis, S.A. Saini, S. Nudd, G.R. C&C Res. Labs., NEC Eur. Ltd, Sankt Augustin, Germany; This paper appears in: Cluster Computing and the Grid, 2003; Pertinent Proceedings. CCGrid 2003. 3rd IEEE/ACM International Symposium on; Publication Date: May 12-15, 2003; Pertinent pp. 198-205.*

(Continued)

*Primary Examiner*—Ramy M Osman
*Assistant Examiner*—Marshall McLeod
(74) *Attorney, Agent, or Firm*—William H. Steinberg; Amy J. Pattillo (57) ABSTRACT

A method, system, and program for facilitating overall grid environment management by monitoring grid activity across disparate grid resources and distributing grid activity to decisional grid modules are provided. A grid workload controller within a computational grid environment monitors real-time grid activity at an application level from multiple disparate grid application environments. The grid workload controller then determines a selection of grid modules within the computational grid environment that require the real-time grid activity to make decisions about the management of the computational grid environment. The grid workload controller distributes the real-time grid activity to the selection of grid modules, wherein the selection of grid modules then make automated decisions within the grid environment to maintain performance requirements.

6 Claims, 5 Drawing Sheets

U.S. PATENT DOCUMENTS

| | | | |
|---|---|---|---|
| 5,884,046 A | 3/1999 | Antonov | |
| 5,905,975 A | 5/1999 | Ausubel | |
| 5,931,911 A | 8/1999 | Remy et al. | 709/223 |
| 5,978,583 A | 11/1999 | Ekanadham et al. | 717/106 |
| 6,003,075 A | 12/1999 | Arendt et al. | |
| 6,021,398 A | 2/2000 | Ausubel | |
| 6,023,612 A | 2/2000 | Harris et al. | |
| 6,049,828 A | 4/2000 | Dev et al. | |
| 6,067,580 A | 5/2000 | Aman | 719/330 |
| 6,119,186 A | 9/2000 | Watts et al. | |
| 6,154,787 A | 11/2000 | Urevig et al. | |
| 6,167,445 A | 12/2000 | Gai et al. | |
| 6,310,889 B1 | 10/2001 | Parsons et al. | |
| 6,356,909 B1 | 3/2002 | Spencer | 707/10 |
| 6,430,711 B1 | 8/2002 | Sekizawa | |
| 6,438,704 B1 | 8/2002 | Harris et al. | 713/502 |
| 6,452,692 B1 | 9/2002 | Yacoub | |
| 6,453,376 B1 | 9/2002 | Fairman et al. | 710/240 |
| 6,463,454 B1 | 10/2002 | Lumelsky et al. | |
| 6,470,384 B1 | 10/2002 | O'Brien et al. | |
| 6,480,955 B1 | 11/2002 | DeKoning et al. | |
| 6,552,813 B2 | 4/2003 | Yacoub | |
| 6,560,609 B1 | 5/2003 | Frey et al. | |
| 6,578,160 B1 | 6/2003 | MacHardy, Jr. et al. | |
| 6,606,602 B1 | 8/2003 | Kolls | |
| 6,625,643 B1 | 9/2003 | Colby et al. | |
| 6,647,373 B1 | 11/2003 | Carlton-Foss | |
| 6,654,759 B1 | 11/2003 | Brunet et al. | |
| 6,654,807 B2 | 11/2003 | Farber et al. | |
| 6,671,676 B1 | 12/2003 | Shacham | 705/37 |
| 6,681,251 B1 | 1/2004 | Leymann et al. | 709/226 |
| 6,701,342 B1 | 3/2004 | Bartz et al. | |
| 6,714,987 B1 | 3/2004 | Amin et al. | |
| 6,717,694 B1 | 4/2004 | Fukunaga et al. | |
| 6,748,416 B2 | 6/2004 | Carpenter et al. | 709/202 |
| 6,816,905 B1 | 11/2004 | Sheets et al. | |
| 6,941,865 B2 | 9/2005 | Kato | |
| 6,954,739 B1 | 10/2005 | Bouillet et al. | |
| 6,963,285 B2 | 11/2005 | Fischer et al. | |
| 7,050,184 B1 | 5/2006 | Miyamoto | |
| 7,055,052 B2 | 5/2006 | Chalasani et al. | |
| 7,080,077 B2 | 7/2006 | Ramamurthy et al. | |
| 7,093,259 B2 | 8/2006 | Pulsipher et al. | |
| 7,096,248 B2 * | 8/2006 | Masters et al. | 709/201 |
| 7,123,375 B2 | 10/2006 | Nobutani et al. | |
| 7,124,062 B2 | 10/2006 | Gebhart | |
| 7,171,654 B2 | 1/2007 | Werme et al. | |
| 7,181,302 B2 | 2/2007 | Bayne et al. | |
| 7,181,743 B2 | 2/2007 | Werme et al. | |
| 7,243,121 B2 | 7/2007 | Neiman et al. | |
| 7,243,147 B2 | 7/2007 | Hodges et al. | |
| 7,245,584 B2 | 7/2007 | Goringe et al. | |
| 7,272,732 B2 | 9/2007 | Farkas et al. | |
| 7,283,935 B1 | 10/2007 | Pritchard et al. | |
| 7,293,092 B2 | 11/2007 | Sukegawa | |
| 7,340,654 B2 | 3/2008 | Bigagli et al. | |
| 7,426,267 B1 | 9/2008 | Caseau | |
| 7,433,931 B2 | 10/2008 | Richoux | |
| 7,437,675 B2 | 10/2008 | Casati et al. | |
| 7,451,106 B1 | 11/2008 | Gindlesperger | |
| 7,472,112 B2 | 12/2008 | Pfleiger et al. | |
| 7,533,168 B1 | 5/2009 | Pabla et al. | |
| 7,552,437 B2 | 6/2009 | Di Luoffo et al. | |
| 7,562,143 B2 | 7/2009 | Fellenstein et al. | |
| 7,584,274 B2 | 9/2009 | Bond et al. | |
| 2002/0023168 A1 | 2/2002 | Bass et al. | |
| 2002/0057684 A1 | 5/2002 | Miyamoto et al. | 370/386 |
| 2002/0072974 A1 | 6/2002 | Pugliese et al. | |
| 2002/0103904 A1 | 8/2002 | Hay | 709/225 |
| 2002/0116488 A1 | 8/2002 | Subramanian et al. | |
| 2002/0152305 A1 | 10/2002 | Jackson et al. | |
| 2002/0171864 A1 | 11/2002 | Sesek | |
| 2002/0188486 A1 | 12/2002 | Gil et al. | |
| 2003/0011809 A1 | 1/2003 | Suzuki et al. | |
| 2003/0036886 A1 | 2/2003 | Stone | |
| 2003/0041010 A1 | 2/2003 | Yonao-Cowan | |
| 2003/0058797 A1 | 3/2003 | Izmailov et al. | |
| 2003/0088671 A1 | 5/2003 | Klinker et al. | |
| 2003/0101263 A1 | 5/2003 | Bouillet et al. | |
| 2003/0108018 A1 | 6/2003 | Dujardin et al. | |
| 2003/0112809 A1 | 6/2003 | Bharali et al. | 370/400 |
| 2003/0115099 A1 | 6/2003 | Burns et al. | 705/14 |
| 2003/0126240 A1 | 7/2003 | Vosseler | |
| 2003/0126265 A1 | 7/2003 | Aziz et al. | |
| 2003/0140143 A1 | 7/2003 | Wolf et al. | |
| 2003/0145084 A1 | 7/2003 | McNerney | 709/224 |
| 2003/0161309 A1 | 8/2003 | Karuppiah | |
| 2003/0195813 A1 | 10/2003 | Pallister et al. | |
| 2003/0204485 A1 | 10/2003 | Triggs | 707/1 |
| 2003/0204758 A1 | 10/2003 | Singh | |
| 2003/0212782 A1 | 11/2003 | Canali et al. | |
| 2004/0064548 A1 | 4/2004 | Adams et al. | |
| 2004/0078471 A1 | 4/2004 | Yang | 709/227 |
| 2004/0095237 A1 | 5/2004 | Chen et al. | |
| 2004/0098606 A1 | 5/2004 | Tan et al. | |
| 2004/0103339 A1 | 5/2004 | Chalasani et al. | |
| 2004/0145775 A1 | 7/2004 | Kubler et al. | |
| 2004/0213220 A1 | 10/2004 | Davis | |
| 2004/0215590 A1 | 10/2004 | Kroening | |
| 2004/0225711 A1 | 11/2004 | Burnett et al. | |
| 2005/0015437 A1 | 1/2005 | Strait | |
| 2005/0021349 A1 | 1/2005 | Chiliotis et al. | |
| 2005/0021742 A1 | 1/2005 | Yemini et al. | |
| 2005/0027691 A1 | 2/2005 | Brin et al. | |
| 2005/0027865 A1 | 2/2005 | Bozak et al. | |
| 2005/0044228 A1 | 2/2005 | Birkestrand et al. | |
| 2005/0065994 A1 | 3/2005 | Creamer et al. | |
| 2005/0108394 A1 | 5/2005 | Braun et al. | |
| 2005/0120160 A1 | 6/2005 | Plouffe et al. | |
| 2005/0132041 A1 | 6/2005 | Kundu | |
| 2005/0138162 A1 | 6/2005 | Byrnes | |
| 2005/0138175 A1 | 6/2005 | Kumar et al. | |
| 2005/0182838 A1 | 8/2005 | Sheets et al. | |
| 2005/0187797 A1 | 8/2005 | Johnson | |
| 2005/0187977 A1 | 8/2005 | Frost | |
| 2005/0257079 A1 | 11/2005 | Arcangeli | |
| 2005/0283788 A1 | 12/2005 | Bigagli et al. | |
| 2006/0064698 A1 | 3/2006 | Miller et al. | |
| 2006/0069621 A1 | 3/2006 | Chang et al. | |
| 2006/0075041 A1 | 4/2006 | Antonoff et al. | |
| 2006/0075042 A1 | 4/2006 | Wang et al. | |
| 2006/0288251 A1 | 12/2006 | Jackson | |
| 2006/0294218 A1 | 12/2006 | Tanaka et al. | |

FOREIGN PATENT DOCUMENTS

| | | | |
|---|---|---|---|
| EP | 1267552 A | 12/2002 | |

OTHER PUBLICATIONS

Title: The DataGrid Workload Management System: Challenges and Results; Journal: Journal of Grid Computing Publisher: Springer Netherlands; ISSN 1570-7873 (Print) 1572-9814 (Online) Issue: vol. 2, No. 4 / Dec. 2004 Pertinent pp. 353-367.*

Foster et al.; The Anatomy of the Grid, Enabling Scalable Virtual Organizations; available at www.globus.org/research/papers/anatomy.pdf as of Nov. 27, 2003.

Foster et al.; The Physiology of the Grid, An Open Grid Services Architecture for Distributed Systems Integration; available at www.globus/org/research/papers/ogsa.pdf as of Nov. 27, 2003.

Foster, Ian; What is the Grid? A Three Point Checklist; available at www-fp.mcs.anl.gov/~foster/Articles/WhatIsTheGrid.pdf as of Nov. 27, 2003.

Ferreira et al.; IBM Redpaper—Globus Toolkit 3.0 Quick Start; available at www.redbooks.ibm.com/redpapers/pdfs/redp369 as of Nov. 27, 2003.

IBM Grid Computing—What is Grid Computing; available at www-1.ibm.com/grid/about_grid/what_is.shtml as of Nov. 27, 2003.

Berstis, Viktors; IBM Redpaper—Fundamentals of Grid Computing; available at www.redbooks.ibm.com/redpapers/pdfs/redp3613.pdf as of Nov. 27, 2003.

Jacob, Bart; IBM Grid Computing—Grid Computing: What are the key components?; available at www-106.ibm.com/developerworks/grid/library/groverview/ as of Nov. 27, 2003.

Unger et al.; IBM Grid Computing—A Visual Tour of Open Grid Services Architecture; available at www-106.ibm.com/developerworks/grid/library/gr-visual/ as of Nov. 27, 2003.

Edited by Rajkumar Buyya; Grid Computing Info Centre: Frequently Asked Questions (FAQ); available at http://www.cs.mu.oz.au/~raj/GridInfoware/gridfaq.html as of Nov. 27, 2003.

Al-Theneyan, Ahmed Hamdan, "A Policy-Based Resource Brokering Environment for Computational Grids" (2002) PhD Dissertation, Old Dominion University, United States—Virginia.

Leff, Avraham, "Service Level Agreements and Commercial Grids", IEEE Internet Computing (Jul.-Aug. 2003): pp. 44-50.

Hill, J.R. "A Management Platform for Commercial Web Services." BT Technology Journal (Jan. 2004): vol. 22, No. 1, pp. 52-62).

Alexander Keller and Heiko Ludwig, "The WSLA Framework: Specifying and Monitoring Service Level Agreements for Web Services." Journal of Network and Systems Management, vol. 11, No. 1, Mar. 2003, pp. 57-81.

Menasce, Daniel A, "QOS in Grid Computing", IEEE Internet Computing (Jul.-Aug. 2004), pp. 85-87.

T Boden, "The Grid Enterprise—Structuring the Agile Business of the Future." BT Technology Journal, vol. 22, No. 1, Jan. 2004, pp. 107-117.

USPTO Office Action, U.S. Appl. No. 11/031,403, Mailing Oct. 24, 2008, 19 pages.

Rolia, Jerry et al, "Service Centric Computing—Next Generation Internet Computing", 2002, Springer-Verlag Berlin Heidelberg, pp. 463-479.

Belloum, Adam et al, "VLAM-G: a grid-based virtual laboratory", 2002, Future Generation Computer Systems 19, Elsevier Science B.V., pp. 209-217.

Min, D. and Mutka, M., "Efficient Job Scheduling in a Mesh Multicomputer Without Discrimination Against Large Jobs", 1995, IEEE., pp. 52-59.

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian Xu et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.

Ian Foster and Carl Kesselman, "Grid2—Blueprint for a New Computing Infrastructure" 2004, Elsevier, San Francisco, CA, chapter 20, Instrumentation and Monitoring, pp. 319-343.

Smallen S et al, "The Inca Test Harness and Reporting Framework" Supercomputing 2004. Proceedings of the ACM/ IEEE SC2004 Conference Pittsburgh, PA, Nov. 2004, p. 1-10.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, "A Fault Tolerance Service for QoS in Grid Computing", Lecture Notes in Computer Science, vol. 2659, Aug. 2003, pp. 286-296.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.

Gever DH, et al, "WWW-based high performance computing support of acoustic matched field processing", MTS/ IEEE Oceans 2001. An Ocean Odessey. Conference Proceedings (IEEE Cat. No. 01CH37295) Marine Technology Soc. Washington, DC, vol. 4, 2001, pp. 2541-2548.

Chase, JS et al, "Dynamic Virtual Clusters in a Grid Site Manager", High Performance Distributed Computing 2003. Proceedings. 12th IEEE International Symposium, Jun. 22-24, 2003, Piscataway, NJ, USA, IEEE, pp. 90-100.

"Method of Providing On-Demand-Computing for Server Blades", IP.com Journal, IP.com Inc., West Henrietta, NY, US, Sep. 8, 2003, p. 1.

Kubicek, C, et al., "Dynamic Allocation of Servers to Jobs in a Grid Hosting Environment", BY Technology Journal, vol. 22, No. 3, Jul. 2004, pp. 251-260.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718.

Ding et al., "An Agent Model for Managing Distributed Software Resources in Grid Environment", 2003, ICCS, LNCS 2658, pp. 971-980.

U.S. Appl. No. 11/031,541, filed Jan. 6, 2005, Fellenstein et al.
U.S. Appl. No. 11/031,542, filed Jan. 6, 2005, Fellenstein et al.
U.S. Appl. No. 11/031,543, filed Jan. 6, 2005, Fellenstein et al.
U.S. Appl. No. 11/031,489, filed Jan. 6, 2005, Fellenstein et al.
U.S. Appl. No. 11/031,403, filed Jan. 6, 2005, Fellenstein et al.
U.S. Appl. No. 11/031,426, filed Jan. 6, 2005, Fellenstein et al.
U.S. Appl. No. 11/031,427, filed Jan. 6, 2005, Fellenstein et al.

Office Action, U.S. Appl. No. 11/031,403, filed Jan. 6, 2005, Mailed Apr. 24, 2009.

Office Action, U.S. Appl. No. 11/031,426, filed Jan. 6, 2005, Mailed Apr. 1, 2009.

Notice of Allowance, U.S. Appl. No. 10/868,542, filed Jun. 15, 2004, Mailed Apr. 16, 2009.

Office Action, U.S. Appl. No. 11/767,502, filed Jun. 23, 2007, Zhendong Bao, Mailed Jun. 25, 2009, pp. 1-14.

Weng et al, "A cost-based online scheduling algorithm for job assignment on computational grids", Springer-Verlag Berlin Heidelberg, 2003, pp. 343-351.

Andrade et al, "Our grid: An approach to easily assemble grids with equitable resource sharing", Springer-Verlag Berlin Heidelberg, 2003, pp. 61-86.

Chase, JS et al, "Dynamic Virtual Clusters in a Grid Site Manager," High Performance Distributed Computing 2003. Proceedings, 12th IEEE International Symposium, Jun. 22-24, 2003, Piscataway, NJ USA, IEEE, pp. 90-100.

Office Action, U.S. Appl. No. 10/940,452, filed Sep. 14, 2004, Craig Fellenstein, Mailed Jun. 23, 2009, pp. 1-13.

Office Action, U.S. Appl. No. 12/211,243, filed Sep. 16, 2008, Di Luoffo et al, Mailed Aug. 12, 2009, pp. 1-18.

Office Action, U.S. Appl. No. 11/031,542, filed Jan. 06, 2005, Dawson et al, Mailed Jul. 7, 2009, pp. 1-15.

Moore et al, "Managing Mixed Use Clusters with Cluster on Demand", Duke University, Nov. 2002.

"IBM Girds for Grids". McConnell, Chris. Enterprise System Journal, Oct. 2001, 1 page.

"Grid Computing set for big growth". Tanner, John, America's Network, vol. 107, No. 8, May 15, 2003, 6 pages.

Office Action, U.S. Appl. No. 12/125,892, filed May 22, 2008, mailed Aug. 26, 2009.

Office Action, U.S. Appl. No. 12/125,879, filed May 22, 2008, mailed Sep. 15, 2009.

Notice of Allowance, U.S. Appl. No. 12/194,989, filed Aug. 20, 2008, mailed Sep. 30, 2009.

Office Action, U.S. Appl. No. 11/031,426, filed Jan. 6, 2005, Carl Philip Gusler et al., Mailed Nov. 13, 2009, 21 pages.

Notice of Allowance, U.S. Appl. No. 11/031,403, filed Jan. 6, 2005, Leslie Mark Ernest et al., Mailed Oct. 5, 2009, 15 pages.

In re Vincent Valentino Di Luoffo, Notice of Allowance, U.S. Appl. No. 12/211,243, filed Sep. 16, 2003, mail date Dec. 31, 2009, 18 pages.

In re Fellenstein, Notice of Allowance, U.S. Appl. No. 10/940,452, filed Sep. 14, 2004, mail date Dec. 16, 2009, 28 pages.

In re Fellenstein, Notice of Allowance, U.S. Appl. No. 12/364,469, filed Feb. 2, 2009, mail date Jan. 5, 2010, 27 pages.

In re Fellenstein, Supplemental Notice of Allowance, U.S. Appl. No. 12/364,469, filed Feb. 2, 2009, mail date Jan. 19, 2010, 7 pages.

In re Fellenstein, Notice of Allowance, U.S. Appl. No. 11/031,542, filed Jan. 6, 2005, mail date Dec. 8, 2009, 35 pages.

In re Fellenstein, Notice of Allowance, U.S. Appl. No. 12/125,879, filed May 22, 2008, mail date Jan. 29, 2010, 24 pages.

In re Fellenstein, Notice of Allowance, U.S. Appl. No. 12/359,216, filed Jan. 23, 2009, mail date Feb. 1, 2010, 25 pages.

In re Fellenstein, Office Action, U.S. Appl. No. 12/491,172, filed Jun. 24, 2009, mail date Apr. 6, 2010, 30 pages.

In re Fellenstein, Office Action, U.S. Appl. No. 12/196,287, filed Aug. 22, 2008, mail date Mar. 30, 2010, 24 pages.

In re Fellenstein, Office Action, U.S. Appl. No. 11/031,489, filed Jan. 6, 2005, mail date Apr. 5, 2010, 28 pages.

TTI Cluster Computing Services On Demand, ClusterOnDemand.com, publicly available and archived by Arhive.org on or before Dec. 8, 2004, 4 pages.

\* cited by examiner

FACILITATING OVERALL GRID ENVIRONMENT MANAGEMENT BY MONITORING AND DISTRIBUTING GRID ACTIVITY

CROSS-REFERENCE TO RELATED APPLICATIONS

The present application is related to the following co-pending applications:
(1) U.S. patent application Ser. No. 11/031,541;
(2) U.S. patent application Ser. No. 11/031,543; and
(3) U.S. patent application Ser. No. 11/031,489.

BACKGROUND OF THE INVENTION

1. Technical Field

The present invention relates in general to improved grid computing and in particular to coordinating automated workload performance controllers within a grid computing environment. Still more particularly, the present invention relates to facilitating automated grid workload performance maintenance by multiple decisional grid modules that make decisions based on grid activity gathered from disparate types of grid resource groups.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request.

While clusters or other groups of servers can be grouped within a grid environment, Grid technologies do not solve all the problems to provide communication between groups of resources managed by different management systems with different standards. In particular, a current problem with Grid technology is the limitations of tools and systems that already monitor each group of systems. In particular, a limitation of standard performance monitors is that these monitors group resources according to the type of hardware resource. For example, a first monitoring tool may monitor pSeries machines while a second monitoring tool monitors systems grouped as zSeries machines (pSeries and zSeries are registered trademarks of International Business Machines Corporation). As a result of grouping resources according to hardware resource, these monitoring tools are limited to monitoring results of performance at a hardware levels. In addition, as a result of grouping resources according to hardware resource, these monitoring tools are limited to using the protocols implemented on the hardware resource and therefore typically not supporting communication directly between monitoring tools.

As clusters and other groups of systems are decentralized into grid environments, it would be advantageous to provide for tracking the grid based activity across disparate hardware and software platforms at an application level, rather than just a hardware level, and balancing grid jobs and grid workload across an entire grid environment including hardware, software, and network resources, rather than just a particular hardware environment. Thus, within a grid environment, it would be advantageous to monitor performance and other activity across the entire grid environment and coordinate distribution of that grid activity to modules affected by current grid activity.

SUMMARY OF THE INVENTION

In view of the foregoing, the present invention in general provides for improved grid computing and in particular to coordinating automated workload performance controllers within a grid computing environment. Still more particularly, the present invention relates to coordinating automated grid workload performance by multiple decisional grid modules according to grid activity gathered from disparate grid resource groups.

According to one embodiment, a grid workload controller within a computational grid environment monitors real-time grid activity at an application level from multiple disparate grid application environments. The grid workload controller then determines a selection of grid modules within the computational grid environment that require the real-time grid activity to make decisions about the management of the computational grid environment. The grid workload controller distributes the real-time grid activity to the selection of grid modules, wherein the selection of grid modules then make automated decisions within the grid environment to maintain performance requirements.

The real-time grid activity may include data such as a newly scheduled grid job, a currently executing grid job, a future job schedule, a current pricing schedule, a future pricing schedule, a current resource availability, and a predicted resource availability. In addition, the real-time grid activity may include commands or instructions decided by a decisional grid module. Grid modules may include, for example, a grid resource allocation module, a grid resource manager module, a grid sell-off module, a grid discounter module, a grid accounting module, and a grid pricing module.

In monitoring the real-time grid activity from multiple disparate grid application environments, the grid workload controller may receive grid activity in multiple protocols requiring adaptation to a particular protocol used by the grid workload controller. In addition to adapting the grid activity, the grid workload controller may filter out grid activity based on the type of grid characteristics within the grid activity and based on which grid application environment or module sends the grid activity. In addition, the grid workload controller may receive the grid activity automatically or the grid workload controller may interrogate resource manager modules for the real-time grid activity, where each of the resource manager modules tracks at least one real-time performance characteristic of a grouping of resource nodes allocated for one from among the multiple disparate grid application environments.

In determining the selection of grid modules that require the real-time grid activity, the grid workload controller may filter the grid activity according to distribution rules that designate which types of grid activity may affect which types of grid modules. The distribution rules may be set by a system administrator or an automated decision controller, for example.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
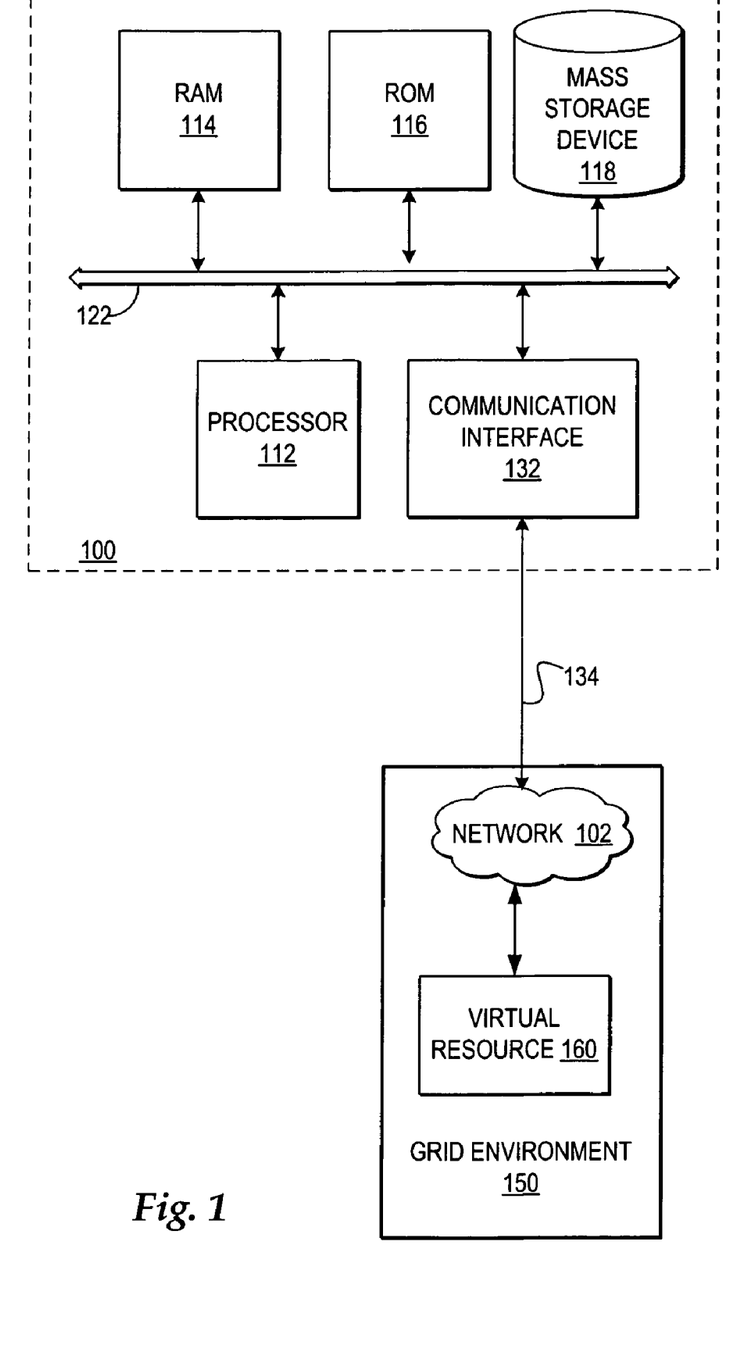
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowcharts of FIG. 7 and others operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media.

Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided within a grid environment 150. Grid environment 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
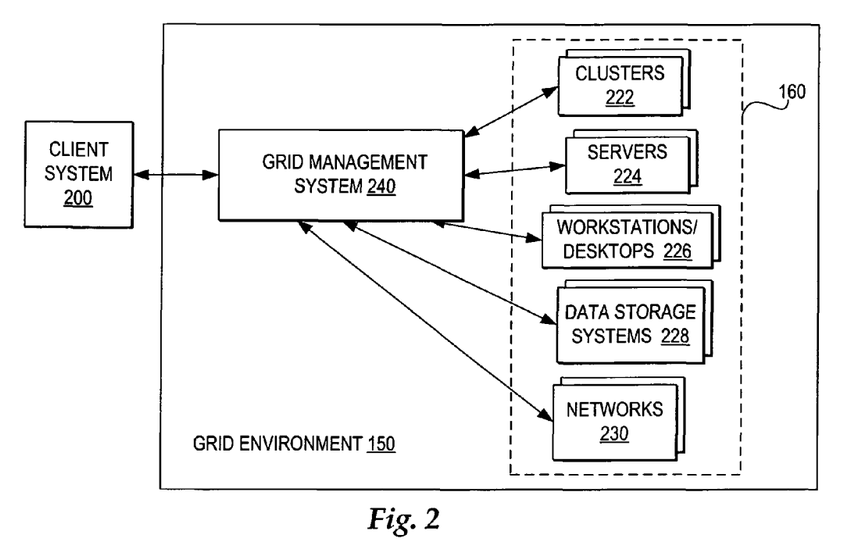
FIG. 2 is block diagram illustrating one embodiment of the general types of components within a grid environment.

With reference now to FIG. 2, a block diagram illustrates one embodiment of the general types of components within a grid environment. In the present example, the components of a grid environment 150 include a client system 200 interfacing with a grid management system 240 which interfaces with server clusters 222, servers 224, workstations and desktops 226, data storage systems 228, and networks 230. For purposes of illustration, the network locations and types of networks connecting the components within grid environment 150 are not depicted. It will be understood, however, that the components within grid environment 150 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 150 are merely representations of the types of components within a grid environment. A grid environment may simply be encompassed in a single computer system or may encompass multiple enterprises of systems. In addition, it will be understood that a grid vendor may provide grid environment 150, where the grid vendor may calculate a cost for use of resources within grid environment 150 based on the amount of time required for a grid job to execute or the actual amount of resources used, for example.

The central goal of a grid environment, such as grid environment 150 is organization and delivery of resources from multiple discrete systems viewed as virtual resource 160. Client system 200, server clusters 222, servers 224, workstations and desktops 226, data storage systems 228, networks 230 and the systems creating grid management system 240 may be heterogeneous and regionally distributed with independent management systems, but enabled to exchange information, resources, and services through a grid infrastructure enabled by grid management system 240. Further, server clusters 222, servers 224, workstations and desktops 226, data storage systems 228, and networks 230 may be geographically distributed across countries and continents or locally accessible to one another. It will be understood that mechanisms for discovery of grid resources within virtual resource 160 are not depicted herein, however, client system 200 may discover the resources within virtual resource 160 as advertised from local and global directories available within grid environment 150.

In the example, client system 200 interfaces with grid management system 240. Client system 200 may represent any computing system sending requests to grid management system 240. In particular, client system 200 may send virtual job requests and jobs to grid management system 240 and grid management system 240 may respond with a grid offer and controls processing of grid jobs. Further, while in the present embodiment client system 200 is depicted as accessing grid environment 150 with a request, in alternate embodiments client system 200 may also operate within grid environment 150.

While the systems within virtual resource 160 are depicted in parallel, in reality, the systems may be part of a hierarchy of systems where some systems within virtual resource 160 may be local to client system 200, while other systems require access to external networks. Additionally, it is important to note, that client system 200 may physically encompass the systems depicted within virtual resources 160.

To implement grid environment 150, grid management system 240 facilitates grid services. Grid services may be designed according to multiple architectures, including, but not limited to, the Open Grid Services Architecture (OGSA). In particular, grid management system 240 refers to the management environment which creates a grid by linking computing systems into a heterogeneous network environment characterized by sharing of resources through grid services.

In one example, grid management system 240 may include multiple grid modules that perform grid services for monitoring the grid activity within grid environment 150. Grid activity may include, but is not limited to, receipt of grid job requests, grid job offers sent out to clients, a newly scheduled grid job, a currently executing grid job, current and future grid pricing, adjustments to grid pricing, current and future predicted workload within virtual resource 160, and current and future allocation and de-allocation of the resources within virtual resource 160. In one embodiment, grid activity indicates the real-time status of grid environment 150, however, in another embodiment, grid modules monitoring and reporting grid activity may delay reporting. Grid modules may include, but are not limited to, monitoring services that monitor current and future performance, workload, and pricing and decisional services that automate decision making within grid environment 150 to maintain performance requirements.

According to an advantage of the invention, grid management system 240 may include a centralized grid workload agent that collects grid activity from across the multiple grid modules and then distributes the grid activity to those grid modules affected by the grid activity. For example, the grid workload agent may collect the data indicating the current workload across a selection of hardware resources from one monitoring module and distribute the current workload to grid modules that determine pricing and availability of resources based on the current workload.

Figure 3:
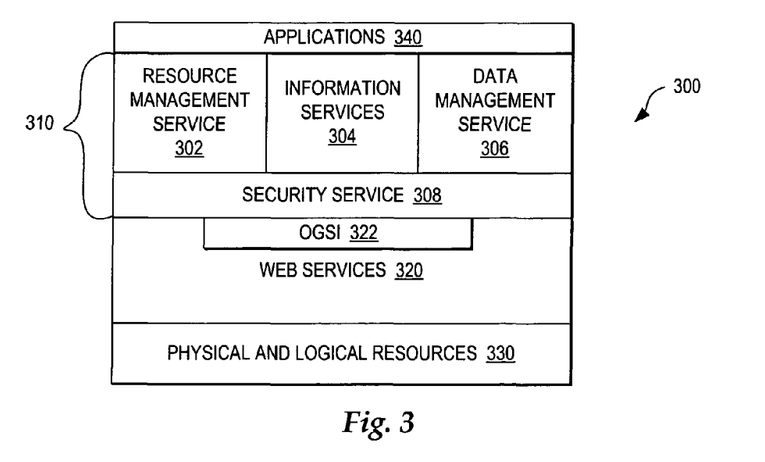
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and extensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services which together provide at least one management function of grid management system 240. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
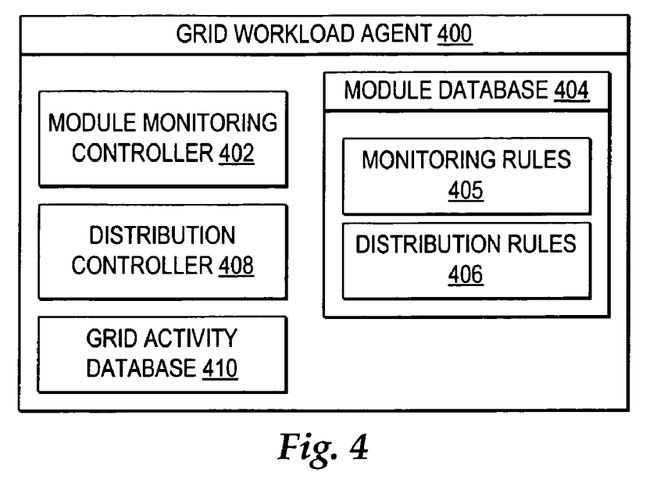
FIG. 4 is a block diagram depicting the components of a grid workload agent for coordinating the monitoring of grid activity from multiple disparate grid modules and distributing the grid activity to those decisional grid modules within a computational grid environment potentially affected by the grid activity.

With reference now to FIG. 4, there is depicted a block diagram of the components of a grid workload agent for coordinating the monitoring of grid activity from multiple disparate grid modules and distributing the grid activity to those decisional grid modules within a computational grid environment potentially affected by the grid activity. As depicted, a grid workload agent 400 includes multiple components, which may be implemented within hardware and software across multiple disparate server systems, or within a single server system, within grid environment 150.

In the example, grid workload agent 400 includes a module database 404. Module database 404 stores information about each grid module that grid workload agent 400 may monitor for grid activity or to which grid workload agent 400 may distribute grid activity. In particular, module database 404 may include monitoring rules 405 that specify a selection of grid modules and types of grid activity to monitor. In addition, module database 404 may include distribution rules 406 that specify which grid modules should receive grid activity and the types of grid activity to distribute to each grid module. It will be understood that monitoring rules 405 and distribution rules 406 may be provided by a system administrator or may be automatically determined based on the type of grid activity information used by grid modules for making decisions within grid environment 150.

In addition, in the example, grid workload agent 400 includes a grid activity database 410 for storing real-time grid activity collected by grid workload agent 400 and for storing records of the distributions of the grid activity to other grid modules. It will be understood that grid activity database 410 may also be referenced by a grid accounting module that calculates job cost.

In the example, grid workload agent 400 includes a module monitoring controller 402 for managing the inquiry to grid modules for grid activity and the receipt of grid activity from grid modules. In particular, module monitoring controller 402 may query those grid modules specified in monitoring rules 405 and may filter received grid activity according to monitoring rules 405. In one example, module monitoring controller 402 may include a queuing system to manage the receipt and distribution of grid activity. For example, a queuing system, such as the MQ Series (MQ Series is a registered trademark of International Business Machines Corporation), may manage the receipt of grid activity packaged using multiple disparate communication protocols and control the distribution of each packaged message to an adapter that is enabled to map the message into a generic protocol used by grid workload agent 400.

In one example, module monitoring controller 402 queries a job offer controller for grid activity indicating grid offers made to client systems requesting resource usage for a particular job. In another example, module monitoring controller 402 queries a resource manager for grid activity indicating the current workload and performance characteristics for a group of resources managed by the resource manager. In yet another example, module monitoring controller 402 queries a pricing controller for grid activity, where the grid activity indicates current pricing for a particular selection of grid resources.

Further, in the example, grid workload agent 400 includes a distribution controller 408 for managing the distribution of grid activity to grid modules. In particular, distribution controller 408 may distribute grid activity according to distribution rules 406. Further, distribution controller 408 may include a mapping controller to map grid activity into a protocol understood by the grid module receiving the grid activity.

Figure 5:
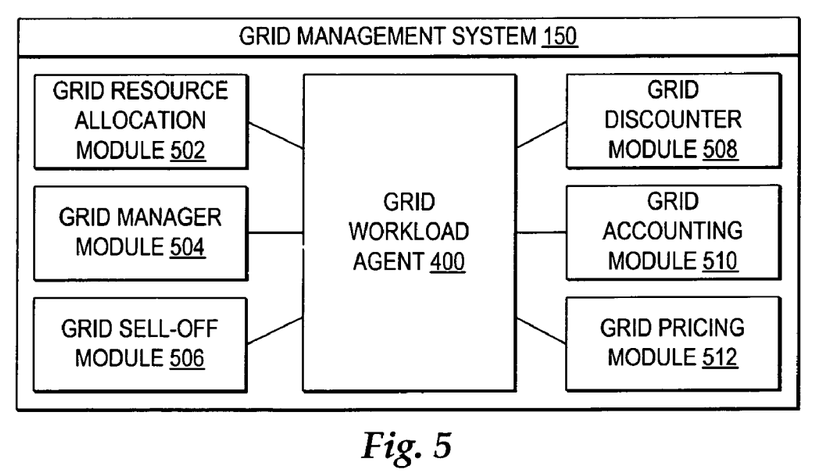
FIG. 5 is a block diagram depicting an example of a grid workload agent interacting with other grid modules within a grid environment in accordance with the method, system, and program of the present invention.

Referring now to FIG. 5, there is depicted a block diagram of an example of a grid workload agent interacting with other grid modules within a grid environment in accordance with the method, system, and program of the present invention. As illustrated, grid management system 240 for an entire grid environment 150 may include multiple grid modules, including a grid workload agent 400. Grid workload agent 400 tracks real-time grid activity received from monitoring and decisional grid modules within grid environment 150 and distributes the grid activity to selections of decisional modules within grid management system 240 that are likely to be affected by the grid activity or require the grid activity to make decisions.

In one example, grid workload agent 400 receives real-time grid activity indicating resource performance and workload from a grid manager module 504. Grid manager module 504 monitors the grid activities for a grid application environment including resources of a same or similar type and manages the nodes within the grid application environment. In particular, grid manager module 504 may submit grid activities that indicate resource usage of a selection of grid resources and the status of grid jobs and workload for the selection of grid resources. Grid workload agent 400 receives the grid activity from grid manager module 504 and may distribute this performance and workload data to other decisional grid modules, such as a grid accounting module 510 that calculates the current cost of a job, a grid resource allocation module 502 that determines whether additional resource nodes should be allocated or de-allocated for particular purposes based on current workload and performance, or a grid sell-off module 506 that attempts to sell-off grid jobs if the current or future predicted workload is too much for the current grid resources.

In another example, grid resource allocation module 502 monitors resource node allocation and de-allocation, including allocation and de-allocation of on-demand grid resources accessed from grid environments outside of grid environment 150. Grid workload agent 400 receives this grid activity from grid resource allocation module 502 and may distribute the allocation activity information to a grid sell-off module 506 that determines whether grid load is too heavy and grid jobs need to be transferred to grid farms or vendors outside grid environment 150.

In yet another example, grid workload agent 400 distributes any grid activity indicating low resource usage levels, currently or predicted for the future, to a grid discounter module 508. Grid discounter module 508 determines whether to offer grid resources as discounted pricing. Decisions by grid discounter module 508 to discount pricing are received by grid workload agent 400 and distributed, for example, to a grid pricing module 512 that determines pricing offers for grid job requests received by grid management system 240.

It will be understood that the grid modules illustrated within grid management system 240 are merely examples of the types of grid modules that may monitor grid activity at an application, hardware, and network level, across grid resources and are merely examples of the types of grid modules that provide automated decisional services within grid management system 240. In particular, additional decisional modules that predict current workload requirement, further workload requirements, and potential changes within the grid environment may receive grid activity.

Figure 6:
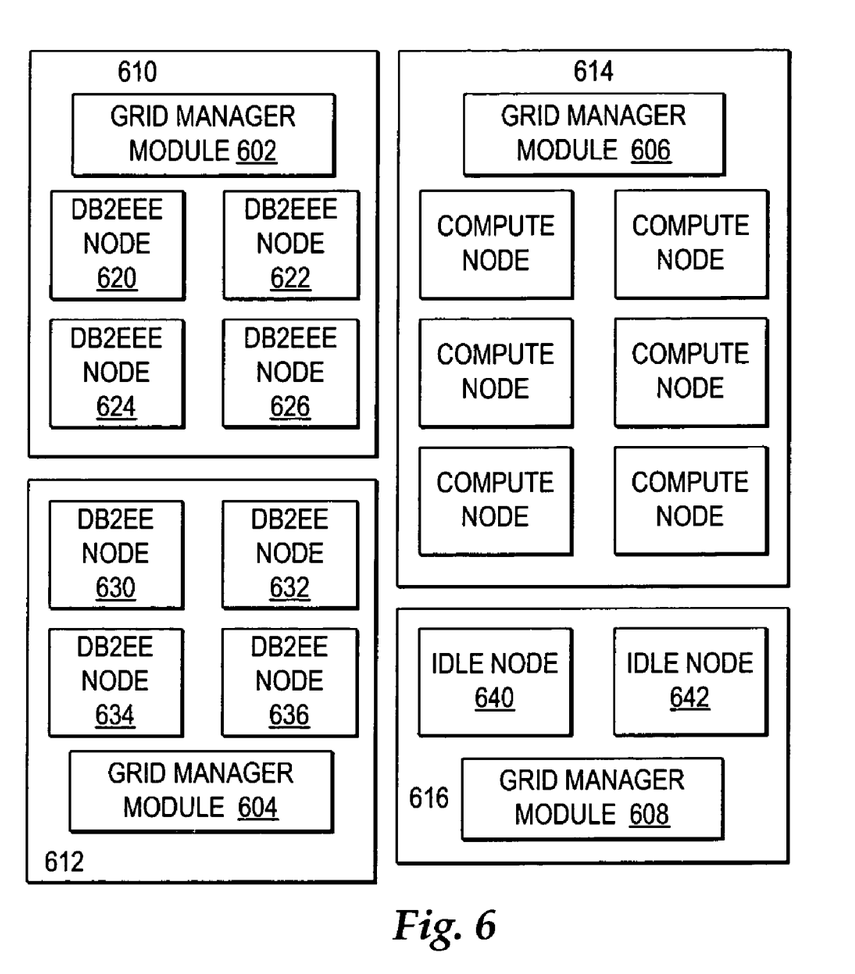
FIG. 6 is a block diagram depicting multiple grid manager modules managing disparate groups of grid resources allocated as nodes in accordance with the method, system, and program of the present invention.

With reference now to FIG. 6, there is depicted a block diagram of multiple grid manager modules managing disparate groups of grid resources allocated as nodes in accordance with the method, system, and program of the present invention. As depicted, multiple grid manager modules 602, 604, 606, and 608 manage the usage of groups of grid resources 610, 612, 614, and 616, respectively.

Each group of grid resources may include multiple nodes, where a node is logical representation of a hardware, software, or network resource assigned to a particular purpose. For example, group 610 includes DB2EEE nodes 620, 622, 624, and 626, monitored and managed within grid environment 150 by grid manager module 402 (DB2 is a registered trademark of International Business Machines Corporation). It will be understood that a group of grid resources may include nodes of the same type of resources or of disparate resources.

In the example, each of groups of grid resources 610, 612, 614, and 616 includes nodes of resources operating on disparate platforms or for different purposes. For purposes of illustration, each group of grid resources represents a different grid application environment. For example, group 610 includes DB2EEE grid nodes 620, 622, 624, and 626 and other associated resources which are dedicated to executing jobs required a parallel DB2 database environment. In another example, group 612 includes DB2EE grid nodes 630, 632, 634, and 636 and other associated resources currently dedicated to executing jobs requiring a standard DB2 database environment. In addition, in another example, group 614 includes six compute nodes, which are dedicated to executing logic which does not require specific applications or data, but rather simply requires powerful CPU's and a high compiled C code mode. Further, in another example, group 616 includes idle nodes 640 and 642, which are included in a pool of resources not currently assigned to execution of any computational tasks and available for incorporation into another grid application environment, such as group 610.

In the example, grid workload agent 400 can track application level grid activity for four separate grid application system environments by communicating with grid manager modules 602, 604, 606, and 608. The grid activity reported by each of grid manager modules 602, 604, 606, and 608 may effect the decisions made by the other grid manager modules and by other grid modules to which grid workload agent 400 distributes grid activity.

In one example, grid manager module 602 may report grid activity to grid workload agent 400 that indicates the DB2EEE nodes within group 610 are only using 50% of the available CPU resources within group 610 and that there no future database jobs requiring a parallel DB2 database environment are scheduled. Grid manager module 602 may distribute this grid activity to grid discounting module 510 that then determines whether to offer discounted pricing for database jobs. In addition, grid manager module 602 may distribute this grid activity to grid resource allocation module 502 that then determines whether to de-allocate a node within group 610 and reallocate the node within another group with a heavier job load. In particular, grid workload agent 400 would manage the communication of grid activity between grid manager module 602 and grid resource allocation module 502 to inform grid manager module 602 that a node will be removed from use for database jobs, work scheduled for the node would be rerouted to other nodes within group 610, and all current transactions would be completed. Once node 622, for example, is idle from DB2EEE transactions, grid workload agent 400 would update the grid modules with grid activity indicating that node 622 is idle and grid manager module 608 would begin monitoring and management of node 622.

In another example, grid manager module 604 detects that the nodes in group 612 are running at 100% capacity and updates grid workload agent 400 with the current capacity. Grid workload agent 400 determines that the capacity percentage should be distributed to grid resource allocation module 502 and to grid pricing module 512. Grid resource allocation module 502 returns grid activity information to grid workload agent 400 indicating whether a new node is allocated to grid group 612. Grid workload agent 400 distributes the new database node grid activity to grid manager module 602. In addition, grid pricing module 512 may determine that the rate for database jobs needs increase for the next ten hours and returns the price increase to grid workload agent 400. Grid workload agent 400 may determine to distribute the price increase to grid accounting module 510 so that grid accounting module 510 can properly calculate a cost of database jobs using grid group 612 for the next ten hours.

It is important to note that while the present example is described with reference to nodes grouped according to application environment, it alternate examples, nodes may be grouped according to other functional criteria, such as hardware environment, network environment, and other groupings. In addition, it will be understood that resource nodes within a grouping may be physically grouped together or may be located in disparate physical locations.

Figure 7:
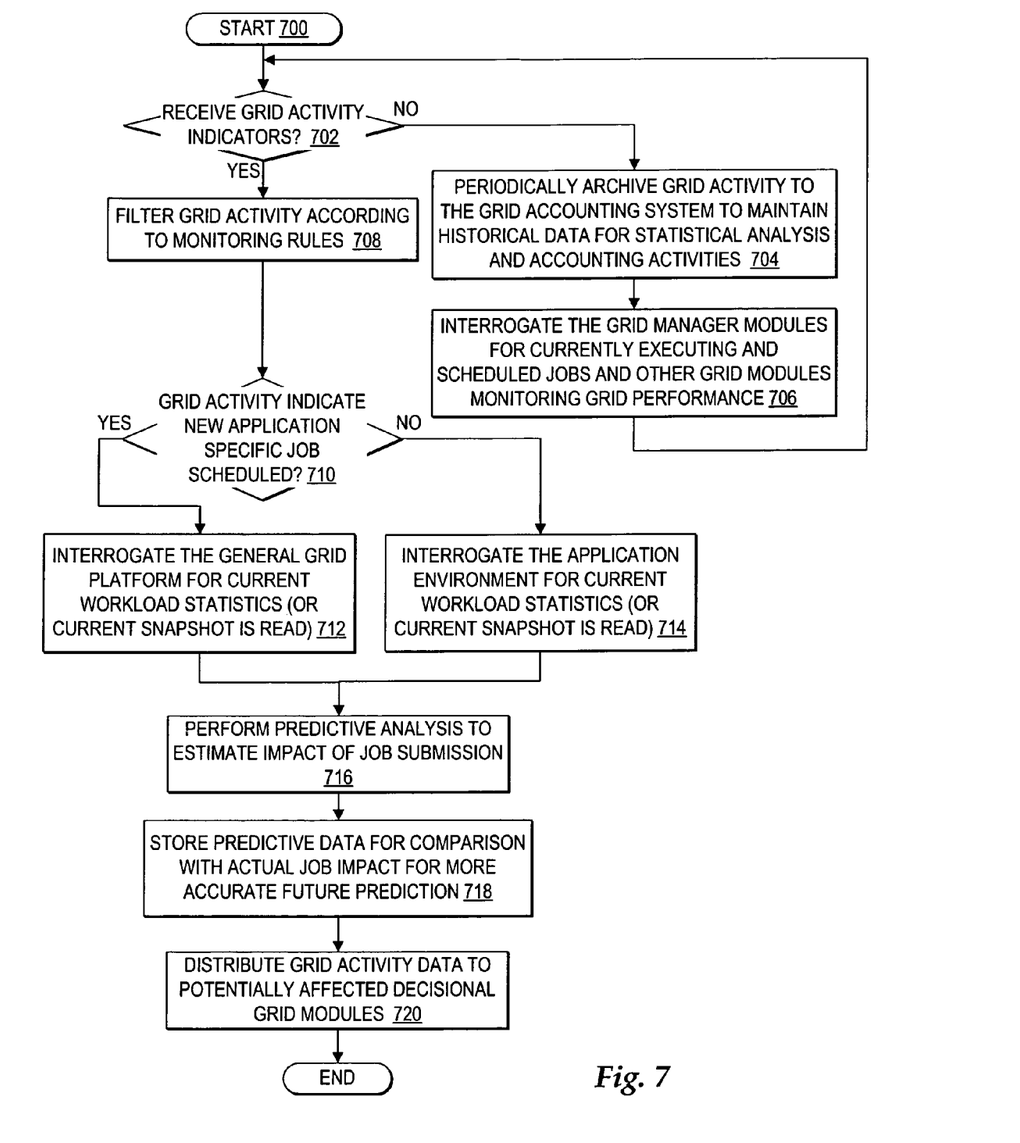
FIG. 7 is a high level logic flowchart of a process and program for coordinating the monitoring and distribution of grid activity across disparate monitoring and decisional grid modules within a grid environment in accordance with the method, system, and program of the present invention.

Referring now to FIG. 7, there is depicted a high level logic flowchart of a process and program for coordinating the monitoring and distribution of grid activity across disparate monitoring and decisional grid modules within a grid environment in accordance with the method, system, and program of the present invention. It will be understood that the process depicted may be executed within grid workload agent 400, controlled by applicable policies and rules, but that additional manual or automated administrative decisions may be required for coordinating the monitoring and distribution of grid activity.

As depicted, the process starts at block 700 and thereafter proceeds to block 702. Block 702 depicts a determination whether grid activity indicators are detected. If grid activity indicates are not detected, then the process passes to block 704. Block 704 depicts periodically archiving grid activity to the grid account module to maintain historical data for statistical analysis and accounting activities. Next, block 706 depicts interrogating the grid manager modules for currently executing and scheduled jobs and other grid modules monitoring grid performance, and the process returns to block 702.

Otherwise, at block 702, if grid activity is detected, then the process passes to block 708. Block 708 depicts filtering the grid activity according to monitoring rules. Next, block 710 depicts a determination whether the activity indicates that a new application specific job is scheduled. If the activity does not indicate that a new application specific job is scheduled, then the process passes to block 714. Block 714 depicts interrogating the application environment for current workload statistics or reading the current archived snapshot of grid activity, and the process passes to block 716. Otherwise, at block 710, if the grid activity indicates a new application specific job is scheduled for performance within the grid environment, then the process passes to block 712. Block 712 depicts interrogating the general grid platform for current workload statistics or the current archived snapshot of grid activity is read, and the process passes to block 716.

Block 716 depicts performing predictive analysis to estimate the impact of the job submission within the grid environment. Next, block 718 depicts storing the predictive data for comparison with actual job impact for more accurate future prediction. Thereafter, block 720 depicts distributing grid activity data to potentially effected decisional grid modules, and the process ends.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for managing workload within a grid environment, comprising:

implementing a grid environment comprising a plurality of computing systems each comprising at least one resource and each of said plurality of computing systems communicatively connected over a network through a grid management system to share each said at least one resource through a plurality of web services implemented within a web services layer extended by an open grid services infrastructure atop a grid service layer comprising a plurality of grid services of said grid management system implemented within an open grid services architecture, said plurality of grid services used by a plurality of separate applications;

storing, by a grid workload controller from among said plurality of grid services, in a module database, identifiers for a plurality of grid modules from among said plurality of grid services, a plurality of monitoring rules specifying a first selection of said plurality of grid modules to monitor for grid activity and a separate type of grid activity from among a plurality of types of grid activity to monitor from each of said first selection of grid modules, and a plurality of distribution rules specifying a second selection of said plurality of grid modules to distribute grid activity to and a separate type of grid activity from among said plurality of types of grid activity to distribute to each of said second selection of grid modules;

managing by each of a plurality of grid manager modules from among said plurality of modules, a separate one of a plurality of disparate grid application environments within said grid environment, wherein a first disparate grid application environment comprises a first selection of grid nodes dedicated to executing jobs requiring a parallel database environment provided by a first application from among said plurality of separate applications, a second disparate grid application environment comprises a second selection of grid nodes dedicated to executing jobs requiring a standard database environment provided by a second application from among said plurality of separate applications, a third disparate grid application environment comprises a third selection of grid nodes dedicated to executing jobs requiring additional processor power and high complied code, and a fourth disparate grid application environment comprises a fourth selection of resources from among said at least one resource currently not assigned and currently available for incorporation into another grid application environment;

monitoring according to said monitoring rules, at a grid workload controller, real-time grid activity comprising current performance characteristics for each said at least one resource monitored by each of said plurality of grid manager modules, current grid jobs scheduled with each of said plurality of grid manager modules, current allocations from among said fourth selection of resources from said plurality of grid manager modules;

determining according to said plurality of distribution rules a selection of grid modules that require said real-time grid activity to make decisions about the management of said grid environment; and distributing, from said grid workload controller, said real-time grid activity to said second selection of grid modules comprising a grid discounting module for determining whether to offer discounted pricing for jobs based on said current grid jobs scheduled, a grid allocation module for determining whether to deallocate a particular grid node within one of said first disparate grid application environment and reallocate said particular grid node within said second disparate grid application environment based on said current performance characteristics and for determining whether to allocate a particular resource from the fourth selection of resources to said first disparate grid application environment based on said current performance characteristics, and a grid pricing module for determining whether to adjust a price for performing a particular job based on said current allocations from among said fourth selection of resources, wherein said second selection of grid modules make automated decisions within said grid environment to maintain workload performance requirements within said grid environment.

2. The computer-implemented method for managing workload according to claim 1, wherein monitoring, at a grid workload controller, real-time grid activity at an application level from a plurality of disparate grid application environments within a computational grid environment, further comprises:

monitoring, at said grid workload controller, said real-time grid activity received in a plurality of protocols requiring adaptation to a particular protocol used by said grid workload controller.

3. A system for managing workload within a grid environment, comprising:

a grid workload controller implemented within a grid environment comprising a plurality of computing systems each comprising at least one resource and each of said plurality of computing systems communicatively connected over a network through a grid management system to share each said at least one resource through a plurality of web services implemented within a web services layer extended by an open grid services infrastructure atop a grid service layer comprising a plurality of grid services of said grid management system implemented within an open grid services architecture, said plurality of grid services used by a plurality of separate applications;

said grid workload controller from among said plurality of grid services for storing, in a module database, identifiers for a plurality of grid modules from among said plurality of grid services, a plurality of monitoring rules specifying a first selection of said plurality of grid modules to monitor for grid activity and a separate type of grid activity from among a plurality of types of grid activity to monitor from each of said first selection of grid modules, and a plurality of distribution rules specifying a second selection of said plurality of grid modules to distribute grid activity to and a separate type of grid activity from among said plurality of types of grid activity to distribute to each of said second selection of grid modules;

each of a plurality of grid manager modules from among said plurality of modules for managing a separate one of a plurality of disparate grid application environments within said grid environment, wherein a first disparate grid application environment comprises a first selection of grid nodes dedicated to executing jobs requiring a parallel database environment provided by a first application from among said plurality of separate applications, a second disparate grid application environment comprises a second selection of grid nodes dedicated to executing jobs requiring a standard database environment provided by a second application from among said plurality of separate applications, a third disparate grid application environment comprises a third selection of grid nodes dedicated to executing jobs requiring additional processor power and high complied code, and a fourth disparate grid application environment comprises a fourth selection of resources from among said at least one resource currently not assigned and currently available for incorporation into another grid application environment;

said grid workload controller for monitoring according to said monitoring rules, at a grid workload controller, real-time grid activity comprising current performance characteristics for each said at least one resource monitored by each of said plurality of grid manager modules, current grid jobs scheduled with each of said plurality of grid manager modules, current allocations from among said fourth selection of resources from said plurality of grid manager modules;

said grid workload controller for determining according to said plurality of distribution rules a selection of grid modules that require said real-time grid activity to make decisions about the management of said grid environment; and said grid workload controller for distributing said real-time grid activity to said second selection of grid modules comprising a grid discounting module for determining whether to offer discounted pricing for jobs based on said current grid jobs scheduled, a grid allocation module for determining whether to deallocate a particular grid node within one of said first disparate grid application environment and reallocate said particular grid node within said second disparate grid application environment based on said current performance characteristics and for determining whether to allocate a particular resource from the fourth selection of resources to said first disparate grid application environment based on said current performance characteristics, and a grid pricing module for determining whether to adjust a price for performing a particular job based on said current allocations from among said fourth selection of resources, wherein said second selection of grid modules make automated decisions within said grid environment to maintain workload performance requirements within said grid environment.

4. The system for managing workload according to claim 3, wherein said means for monitoring real-time grid activity at an application level from a plurality of disparate grid application environments within said computational grid environment, further comprises:

means for monitoring said real-time grid activity received in a plurality of protocols requiring adaptation to a particular protocol used by said grid workload controller.

5. A computer program product, residing on a computer readable medium, for managing workload within a grid environment, comprising:

means for implementing a grid environment comprising a plurality of computing systems each comprising at least one resource and each of said plurality of computing systems communicatively connected over a network through a grid management system to share each said at least one resource through a plurality of web services implemented within a web services layer extended by an open grid services infrastructure atop a grid service layer comprising a plurality of grid services of said grid management system implemented within an open grid services architecture, said plurality of grid services used by a plurality of separate applications;

means for storing, by a grid workload controller from among said plurality of grid services, in a module database, identifiers for a plurality of grid modules from among said plurality of grid services, a plurality of monitoring rules specifying a first selection of said plurality of grid modules to monitor for grid activity and a separate type of grid activity from among a plurality of types of grid activity to monitor from each of said first selection of grid modules, and a plurality of distribution rules specifying a second selection of said plurality of grid modules to distribute grid activity to and a separate type of grid activity from among said plurality of types of grid activity to distribute to each of said second selection of grid modules;

means for managing by each of a plurality of grid manager modules from among said plurality of modules, a separate one of a plurality of disparate grid application environments within said grid environment, wherein a first disparate grid application environment comprises a first selection of grid nodes dedicated to executing jobs requiring a parallel database environment provided by a first application from among said plurality of separate applications, a second disparate grid application environment comprises a second selection of grid nodes dedicated to executing jobs requiring a standard database environment provided by a second application from among said plurality of separate applications, a third disparate grid application environment comprises a third selection of grid nodes dedicated to executing jobs requiring additional processor power and high complied code, and a fourth disparate grid application environment comprises a fourth selection of resources from among said at least one resource currently not assigned and currently available for incorporation into another grid application environment;

means for enabling monitoring according to said monitoring rules, at a grid workload controller, of real-time grid activity comprising current performance characteristics for each said at least one resource monitored by each of said plurality of grid manager modules, current grid jobs scheduled with each of said plurality of grid manager modules, current allocations from among said fourth selection of resources from said plurality of disparate grid application environments within a computational grid environment;

means for determining according to said plurality of distribution rules a selection of grid modules that require said real-time grid activity to make decisions about the management of said grid environment; and means for controlling from said grid workload controller, said real-time grid activity to said second selection of grid modules comprising a grid discounting module for determining whether to offer discounted pricing for jobs based on said current grid jobs scheduled, a grid allocation module for determining whether to deallocate a particular grid node within one of said first disparate grid application environment and reallocate said particular grid node within said second disparate grid application environment based on said current performance characteristics and for determining whether to allocate a particular resource from the fourth selection of resources to said first disparate grid application environment based on said current performance characteristics, and a grid pricing module for determining whether to adjust a price for performing a particular job based on said current allocations from among said fourth selection of resources.

6. The computer program product for managing workload according to claim 5, wherein said means for enabling monitoring of real-time grid activity at an application level from a plurality of disparate grid application environments within a computational grid environment, further comprises:

means for enabling monitoring of said real-time grid activity received in a plurality of protocols requiring adaptation to a particular protocol used by said grid workload controller.

* * * * *